United States Patent [19]
Asou et al.

[11] Patent Number: 5,597,015
[45] Date of Patent: Jan. 28, 1997

[54] ELECTROMAGNETIC PILOT TYPE SELECTOR VALVE

[75] Inventors: Yoshio Asou; Bunya Hayashi; Hideharu Sato; Takumi Matsumoto, all of Yawara-mura, Japan

[73] Assignee: SMC Corporation, Tokyo, Japan

[21] Appl. No.: 159,586

[22] Filed: Dec. 1, 1993

[51] Int. Cl.$^6$ ............................................. F15B 13/043
[52] U.S. Cl. ................................ 137/625.64; 137/884
[58] Field of Search ........................ 137/625.64, 884

[56] References Cited

U.S. PATENT DOCUMENTS

| | | | |
|---|---|---|---|
| 2,955,617 | 10/1960 | Collins | 137/625.64 |
| 3,425,449 | 2/1969 | Leibfritz . | |
| 3,540,480 | 11/1970 | Leibfritz et al. | 137/625.6 |
| 5,437,306 | 8/1995 | Asou et al. | 137/625.64 |

FOREIGN PATENT DOCUMENTS

| | | |
|---|---|---|
| 0374438 | 6/1990 | European Pat. Off. . |
| 1054297 | 4/1959 | Germany . |
| 64-41778 | 3/1989 | Japan ................. 137/625.64 |
| 3-20185 | 1/1991 | Japan ................. 137/625.64 |
| 4-60287 | 2/1992 | Japan ................. 137/625.64 |
| 4-25081 | 2/1992 | Japan ................. 137/625.64 |
| 1526630 | 9/1978 | United Kingdom . |

*Primary Examiner*—Gerald A. Michalsky
*Attorney, Agent, or Firm*—Oblon, Spivak, McClelland, Maier, & Neustadt, P.C.

[57] ABSTRACT

An electromagnetic pilot type selector valve which can serve as a double-solenoid type selector valve or a single-solenoid type selector valve by merely increasing or decreasing the number of solenoid mechanisms and by providing a few component parts. This selector valve includes large and small pistons having different pressure receiving areas for driving a main valve disc. When two solenoid mechanisms are mounted, the main valve disc is switched over by pilot fluid pressure alternately applied on the two pistons. When one solenoid mechanism is mounted, the main valve disc is switched over by switching pilot fluid pressure applied on the large size piston, while the main valve disc is constantly pushed in one direction by pilot fluid pressure applied on the small size piston.

4 Claims, 6 Drawing Sheets

1

ELECTROMAGNETIC PILOT TYPE SELECTOR VALVE

FIELD OF THE INVENTION

The present invention relates to an electromagnetic pilot type selector valve to operate a main valve unit by an electromagnetically operated pilot valve unit.

BACKGROUND OF THE INVENTION

It is widely known in the art that the electromagnetic pilot type selector valve of this type is divided to a single-solenoid type selector valve having a pilot valve unit provided with a single solenoid mechanism and a double-solenoid type selector valve having two solenoid mechanisms.

In general, the double-solenoid type selector valve comprises a main valve unit having a spool type main valve disc to switch over main fluid, and a pilot valve unit provided with two solenoid mechanisms for switching pilot fluid. By actuating these solenoid mechanisms alternately, pilot fluid is switched over, and by alternately applying pilot fluid pressure on pistons on both ends in axial direction of the main valve disc, the main valve disc is switched over.

The single-solenoid type selector valve comprises a main valve unit having a spool type main valve disc for switching main fluid, and a pilot valve unit provided with a solenoid mechanism for switching pilot fluid. The main valve disc is pushed permanently in one direction at one end in axial direction by force of a spring or by pilot fluid pressure, and by turning on or off the solenoid mechanism to apply or release pilot fluid pressure to the piston on the other end of the main valve disc, the main valve disc is switched over.

The double-solenoid type selector valve and the single-solenoid type selector valve are generally constituted by special-purpose components, and it is practically impossible to use the components in common for these two types of valve except a few parts.

However, it is desirable to use common components for these two types of valves. For example, if it is designed in such manner that a double-solenoid type selector valve is produced by assembling two solenoid mechanism on a valve body assembly and that a single-solenoid type selector valve is produced by assembling a solenoid mechanism on the same valve body assembly, it will be very convenient for manufacture, parts control and maintenance as well as for repair when in trouble or change of models of the electromagnetic valve. Further, it will be possible to reduce the costs.

SUMMARY OF THE INVENTION

It is an object of the present invention to provide a selector valve, in which components parts are used in common for a double-solenoid type selector valve and a single-solenoid type selector valve, and the double-solenoid type selector valve or the single-solenoid type selector valve can be produced in simple and reliable manner by merely increasing or decreasing the number of solenoid mechanisms using the same parts and by performing simple manipulation and parts replacement associated with the change of the number of solenoid mechanisms.

To attain the above object, the present invention provides an electromagnetic pilot type selector valve, which comprises a main valve body having an input port, an output port and discharge port for main fluid and a spool type main valve disc for switching communication of these ports, two end plates mounted on both ends in axial direction of the main valve body, large and small pistons for driving main valve disc having different pressure receiving areas and mounted in large and small piston chambers on said end plates and positioned on both ends in axial direction of the main valve disc, a pilot valve body mounted on one of the end plates and having two pilot supply valve seats positioned between the input port and each of the piston chambers and two pilot discharge valve seats positioned between each of the piston chambers and the discharge port, a solenoid mechanism replaceably mounted on the pilot valve body and used for opening or closing the pilot supply valve seats and the pilot discharge valve seats, two manual operators for manually communicating the input port and the large size piston chamber with the smell size piston chamber, and a power feeding means for feeding power to the solenoid mechanism.

In case the above selector valve comprises two solenoid mechanisms for opening and closing two sets of pilot supply valve seats and pilot discharge valve seats, it is used as a double-solenoid type selector valve. In case one solenoid mechanism is provided for opening and closing the pilot supply valve seats between the input port and the large size piston chamber and for opening and closing the pilot discharge valve seats between the large size piston chamber and the pilot discharge port, said small size piston chamber and the input port are directly communicated, and the pilot supply valve seat not in use between the input port and the small size piston chamber is closed by an adequate means, it can be used as a single-solenoid type selector valve.

In case it is assembled as the single-solenoid type selector valve, it is preferable to mount a dummy body to fill the space at the position corresponding to the pilot supply valve seat not in use and the pilot discharge valve seat.

Also, it is preferable that two solenoid mechanisms in case it is assembled as the double-solenoid type selector valve and the solenoid mechanism and the dummy body in case it is assembled as the single-solenoid type selector valve are integrally connected by connecting mechanisms formed on the sides thereof.

The above connecting mechanism have the structure identical to each other having engaging rims and engaging grooves in parallel to axial lines of the solenoid mechanism and the dummy body. By engaging these engaging rims with the engaging grooves in axial direction, it is possible to closely connect and overlap these two solenoid mechanisms or a solenoid mechanism and the dummy body without causing gap between them.

DETAILED DESCRIPTION OF THE PREFERRED EMBODIMENTS

Figure 1:
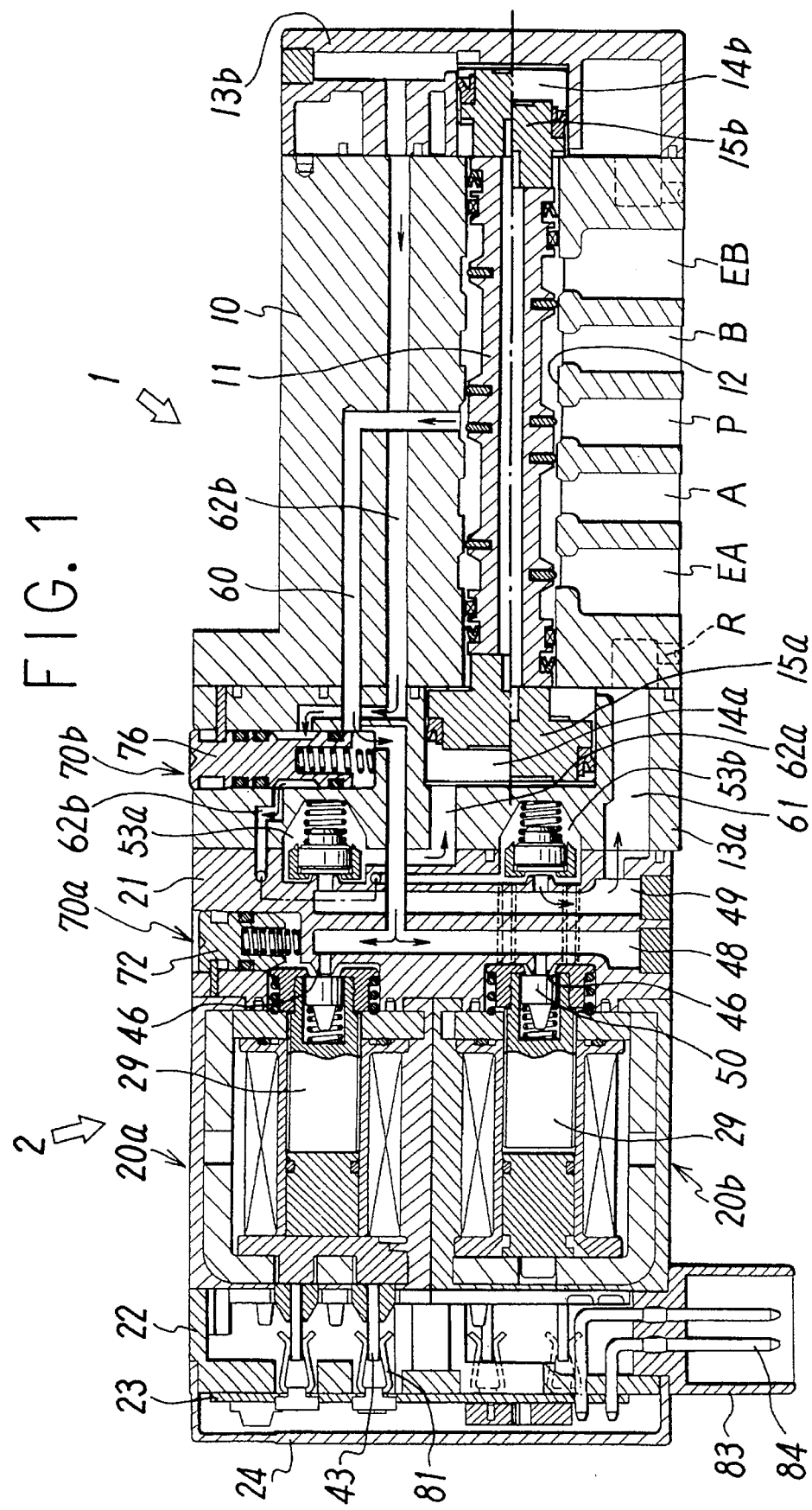
FIG. 1 is a cross-sectional view of a double-solenoid type selector valve, which is the first embodiment of the present invention.

FIG. 1 to FIG. 5 each represents an example of a double-solenoid type selector valve having a pilot valve unit provided with a two solenoid mechanism of the electromagnetic pilot type selector valve of the present invention. This double-solenoid type selector valve comprises a main valve unit 1 incorporated with a spool type main valve disc 11 for controlling main fluid such as compressed air and an electromagnetically operated pilot valve unit for controlling pilot fluid to switch the main valve disc 11.

A valve body 10 in shape of approximately rectangular parallelopiped in the above main valve unit 1 comprises an input port P, output ports A and B, discharge ports EA and EB and a valve bore 12 to communicate these ports with each other, and said main valve disc 11 is inserted in said valve bore 12 so that it can be slided in an axial direction. On both ends of said valve body 10, end plates 13a and 13b each in shape of a rectangular parallelopiped are mounted, and a large size piston chamber 14a and a small size piston chamber 14b are formed on the end plates 13a and 13b respectively to face to said valve bore 12. In these piston chambers, a large size piston 15a and a small size piston 15b with different pressure receiving areas are arranged so that the pistons are slided in an axial direction of the main valve disc 11. When the main valve disc 11 is pushed rightward by the large size piston 15a as shown in the upper half of FIG. 1, ports P and A and ports B and EB are communicated with each other. When the main valve disc 11 is pushed leftward by the small size piston 15b as shown in the lower half of FIG. 1, the ports P and B and ports A and EA are communicated with each other.

As it is evident from FIG. 2, said pilot valve unit 2 comprises a first solenoid 20a and a second solenoid 20b aligned at upper and lower positions and connected with each other by a means as described later, a pilot valve body 21 serving as a switching base for supplying or discharging pilot fluid to or from said piston chambers 14a and 14b, a terminal block 22 comprising a power feeding means for feeding power to the solenoids 20a and 20b, a terminal board 23 retained on said terminal block 22, and a cover for covering said terminal board 23.

Figure 4:
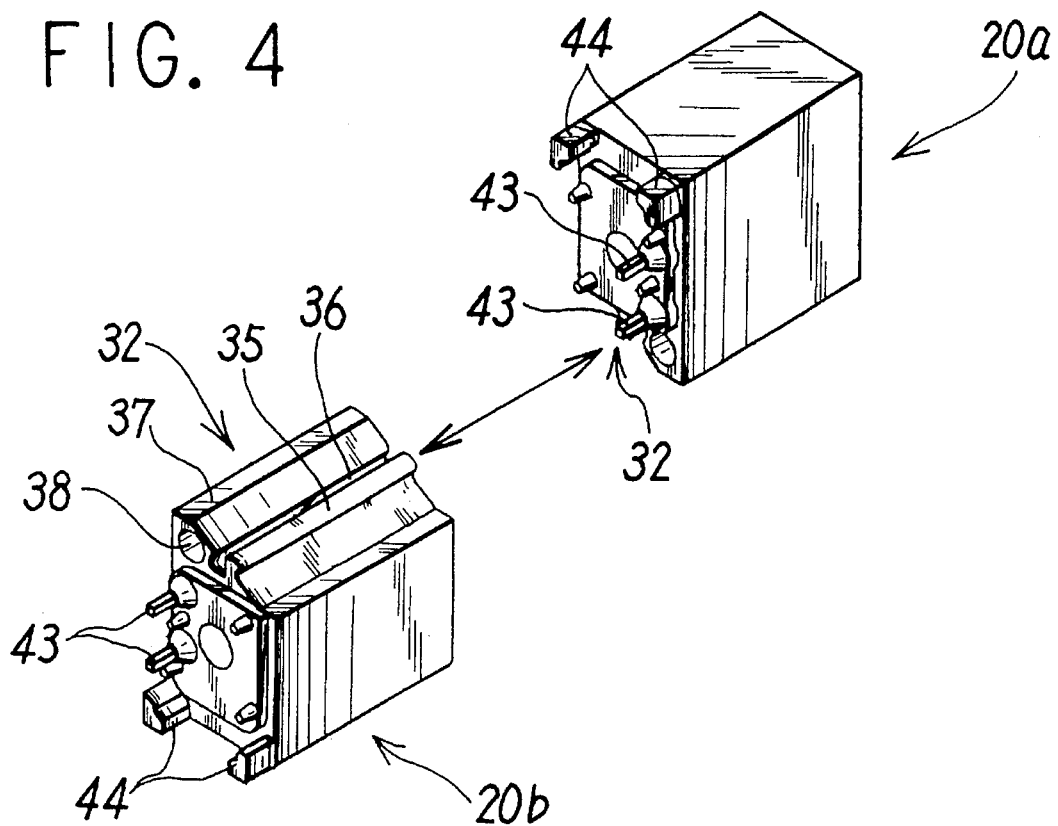
FIG. 4 is a separated perspective view of two solenoid mechanisms.
Figure 5:
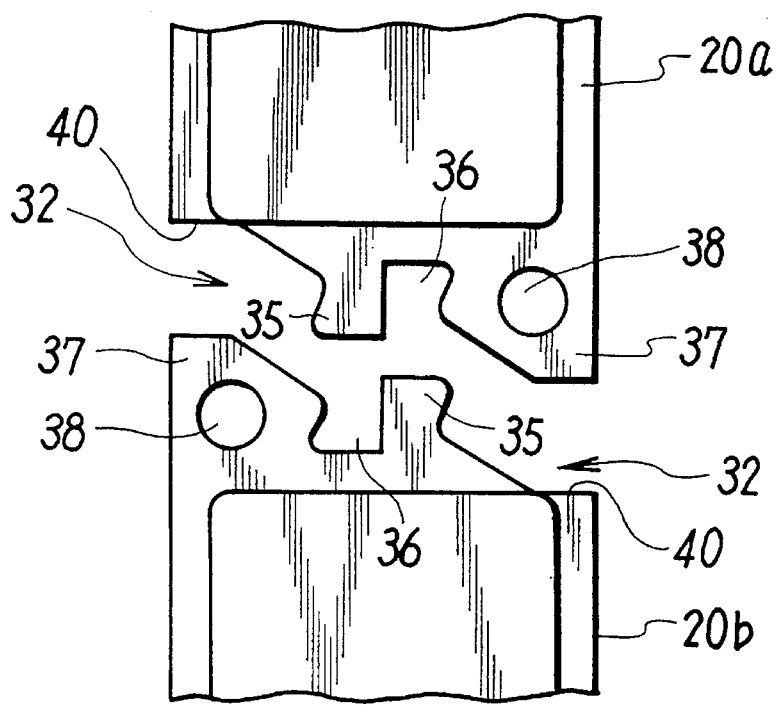
FIG. 5 is a front view of a connecting mechanism of the solenoid mechanism when it is separated.

The above two solenoids 20a and 20b are designed in such manner that these have the same structure and the same external shape and having the following construction: Each of the solenoids 20a and 20b comprises a coil 27 wound on a bobbin 26 made of non-magnetic material, a fixed iron core 28 fixed in a iron core chamber at the center of said bobbin 26, a movable iron core 29 movable in an axial direction within the iron core chamber, and a magnetic frame 30 enclosing these components and made of magnetic material, and by molding the circumference of said magnetic frame with an insulating material 31 such as synthetic resin, an irregular rectangular parallelopiped having three sides each in form of plane and a connecting mechanism 32 on the remaining one side as seen in FIG. 4 and FIG. 5 is provided.

In the above connecting mechanism 32, an engaging rim 35 with its top slightly thicker then its base arranged in parallel to axial line of each of the solenoids 20a and 20b is provided at a position deviated by a given distance from the center on the side in lateral direction toward either side, and an engaging groove 36 with groove width at bottom slightly enlarged is provided in parallel to axial line of each of the solenoids 20a and 20b at a position deviated by the same distance as in the above engaging rim 35 from the center toward the opposite side. At outer end of the engaging groove 36, a projected wall 37 is provided in parallel to said engaging groove 36. On outer side of the engaging rim 35, a recess 40 to match said projected wall 37 is provided, and a mounting hole 38 is formed inside said projected wall 37. As shown in FIG. 5, the above two solenoids 20a and 20b are arranged at different positions in axial direction with connecting mechanisms 32 facing to each other. By bringing them closer along axial line to each other and by engaging each engaging rim 35 in the engaging groove 36 of the other solenoid, these are connected and overlapped tightly without using any screw and without causing gap between them as shown in FIG. 4.

When one of the two solenoids 20a and 20b thus connected falls in trouble, and the two solenoids are to be separated to replace it, these can be easily separated by reversing the connecting procedure. Also, in this case, it will suffice that one type of solenoid is furnished because the two solenoids are designed in the same structure and in the same external shape. Accordingly, it is easy to correct the trouble when one of them is in failure.

In the mounting hole 38 formed inside the projected wall 37, bolts 39 are passed through, and each of the solenoids 20a and 20b are fixed by the bolts in the pilot valve body 21 together with the terminal block 22. In this case, since the two solenoids 20a and 20b are firmly connected together by the connecting mechanism 32 as described above, it is possible to firmly fix the solenoids 20a and 20b on the pilot valve body 21 by the above two bolts 39 and 39. The pilot valve body 21 is fixed on the valve body 10 together with the end plate 13a by bolts 41.

On end surface of each of the solenoids 20a and 20b facing to the terminal block 22, a receiving terminal 43 comprising two pins is projected respectively, and a projection 44 for positioning when the terminal block 22 is mounted is provided at end corner on both ends on the side opposite to the side where the above connecting mechanisms is arranged.

The pilot valve body 21 comprises two pilot supply valve seats 46 and 46, two pilot discharge valve seats 47 and 47 formed in opposite direction at coaxial position to the pilot supply valve seats 46 and 46, a pilot common input passage 48 communicated with the pilot supply valve seats 46 and 46, and a common discharge passage 49 communicated with the pilot discharge valve seats 47 and 47, whereby the pilot supply valve seats 46 are opened or closed by pilot supply valve discs 50 retained on the movable iron cores 29 of the solenoids 20a and 20b, and the pilot discharge valve seats 47 are opened or closed by pilot discharge valve discs 51 arranged in discharge valve chests 53a and 53b between the pilot valve body 21 and the end plate 13a.

Each of the pilot supply valve discs 50 is pushed together with the movable iron core 29 by springs 55 within supply valve chests 52a and 52b toward the direction to close the pilot supply valve seat 46, and each of the pilot discharge valve discs 51 is pushed by springs 58 toward the direction to close the pilot discharge valve seats 47. As represented by lower solenoid 20b in FIG. 1, the supply valve chests 52a and 52b and the discharge valve chests 53a and 53b where the valve discs 50 and 51 are accommodated are communicated with each other by a communication passage 56, and a valve rod 57 linked with the pilot supply valve disc 50 and used to open or close the pilot discharge valve disc 5 is freely engaged in each of the communication passages 56. When the pilot supply valve disc 50 is closed, the valve rod 57 is pushed against the force of the spring 58 and opens the pilot discharge valve disc 51. When the pilot supply valve disc 50 is opened, the pilot discharge valve disc 51 is closed by a resilient force of the spring 58. Accordingly, when power is connected to the solenoids 20a and 20b and the movable iron core 29 is attracted to the fixed iron core 28 (the status of the upper solenoid 20a in FIG. 1), the pilot supply valve disc 50 opens the pilot supply valve seat 46, and the pilot discharge valve disc 51 closes the pilot valve discharge valve seat 47. When power to the solenoids is shut off and the movable iron core 29 is separated from the fixed iron core 28 (the status of the lower solenoid 20b in FIG. 1), the pilot supply valve disc 50 closes the pilot supply valve seat 46 and the pilot discharge valve disc 51 opens the pilot discharge valve seat 47.

The pilot common input passage 48 is communicated with an input port P via a pilot supply passage 60 through a manual operator 70b as described later, and a pilot common discharge passage 49 is communicated with a pilot discharge port R via a pilot discharge passage 61. Also, the discharge valve chest 53a on the solenoid 20a side is communicated with the piston chamber 14a through a pilot output passage 62a, and the discharge valve chest 53b on the solenoid 20b side is communicated with the piston chamber 14b via another pilot output passage 62b through the above manual operator 70b. Therefore, when one solenoid 20a is actuated and the pilot supply valve seat 46 is opened and the pilot discharge valve seat 47 is closed, the pilot fluid flows into the discharge valve chest 53a through the communication passage 56 from the supply valve chest 52a and then flows into the piston chamber 14a through the pilot output passage 62a. As a result, the piston 15a is pushed, and the main valve disc 11 is moved to the right in FIG. 1. In this case, the piston chamber 14b on the opposite side is communicated with the pilot discharge port R through the pilot output passage 62b and the discharge valve chest 53b. When the other solenoid 20b is actuated and the pilot supply valve seat 46 is opened and the pilot discharge valve seat 47 is closed, the pilot fluid flows into the discharge valve chest 53b from the supply valve chest 52b through the communication passage 56 and then flows into the piston chamber 14b through the pilot output passage 62b. Thus, the piston 15b is pushed, and the main valve disc 11 is moved to the left in FIG. 1. In this case, the piston chamber 14a on the opposite side is communicated with the pilot discharge port R through the pilot output passage 62a and the discharge valve chest 53a.

Two manual operators 70a and 70b to match the solenoids 20a and 20b are provided in order that the main valve disc 11 can be switched over by manual operation when the solenoids 20a and 20b cannot be actuated due to power suspension.

The manual operators 70a to match the solenoid 20a is provided with an operating shaft 72 tapered to its forward end. This operating shaft 72 is inserted into a bore 73 so that it can be moved in axial direction and it is pushed by a spring 74 in retracting direction. In this manual operator 70a, when the operating shaft 72 is pushed by the spring 74 and is at retracted position, its forward end is separated from the movable iron core 29 of the solenoid 20a. When, the operating shaft 72 is pushed in against the force of the spring 74 as shown in FIG. 1, the side of the forward end touches the movable iron core 29, which closes the pilot supply valve seat 46 and moves the movable iron core 29 back, thus opening the pilot supply valve seat 46. As a result, the pilot fluid flows into the piston chamber 14a from the supply valve chest 52a through the discharge valve chest 53a and from the pilot output passage 62a. Thus, the piston 15a is pushed, and the main valve disc 11 is moved to the right in FIG. 1. When the operating shaft 72 is released, the operating shaft 72 is returned by the force of the spring 74 and the movable iron core 29 is released. As a result, the pilot supply valve seat 46 is closed.

In the manual operator 70b to match the solenoid 20b, an operating shaft 76 to switch over the communication of these passages is inserted in axial direction in a bore 77, to which the pilot supply passage 60 and the pilot output passage 62b are opened, and it is pushed by force of a spring 78 in retracting direction. In the manual operator 70b, when the operating shaft 76 is pushed by the spring 78 and is at retracted position, the pilot supply passage 60 makes the input port P communicate with the pilot common input passage 48, and the passage 62b makes the piston chamber 14 communicate with the discharge valve chest 53b on the solenoid 20b side. When the operating shaft 76 is pushed in against the force of the spring 78, the communication of the above passages is switched over by the operating shaft 76, and the pilot supply passage 60 is communicated with the pilot output passage 62b. As a result, the input port P is directly communicated with the piston chamber 14b. Thus, the pilot fluid flows into the piston chamber 14b, pushes the piston 15b and moves the main valve disc 11 leftward in the figure. When the operating shaft 76 is released, the operating shaft 76 is returned by the force of the spring 78, and the passages are communicated with each other as shown in FIG. 1.

Figure 2:
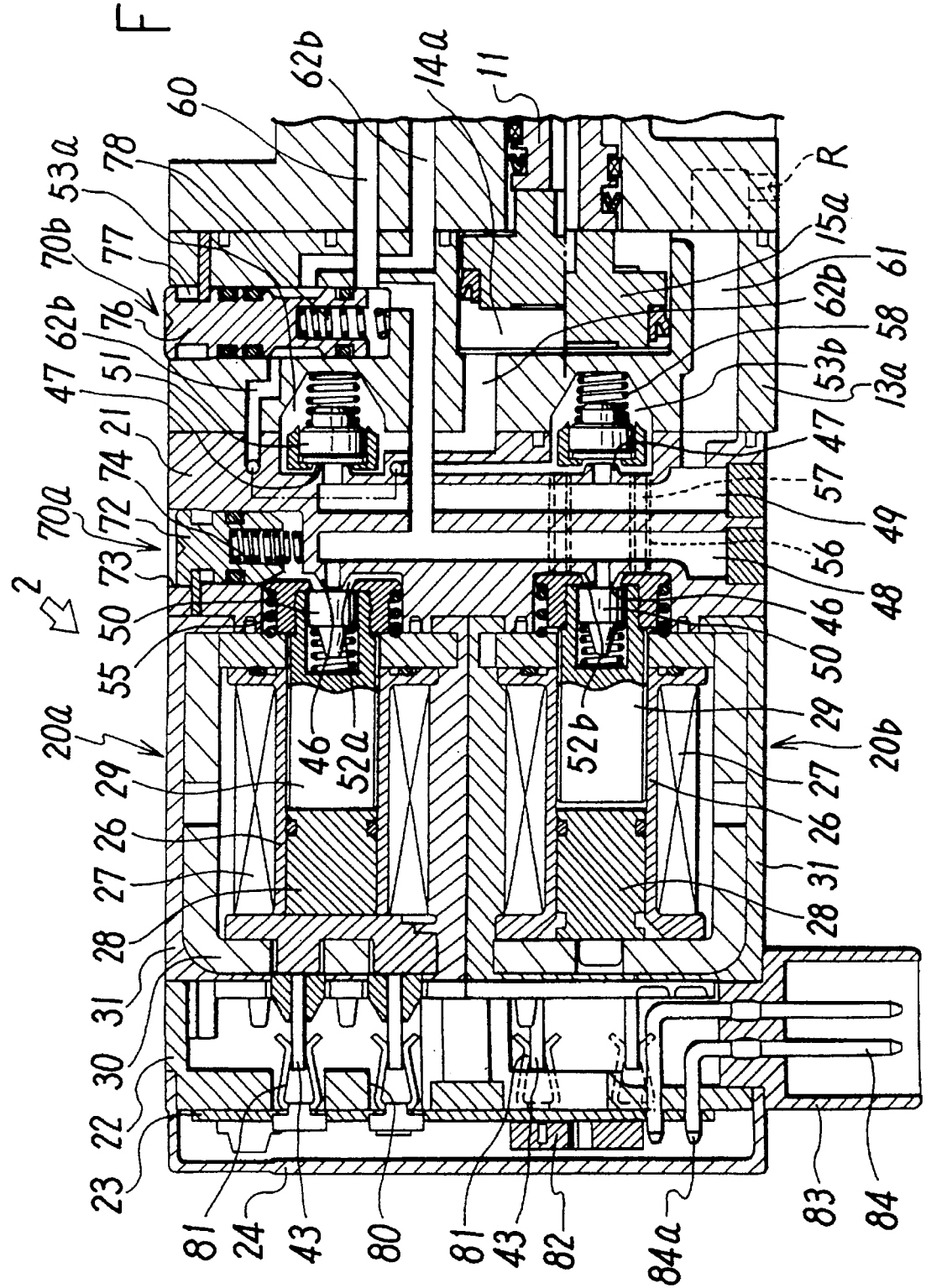
FIG. 2 is an enlarged view of an essential part of the selector valve of FIG. 1.
Figure 3:
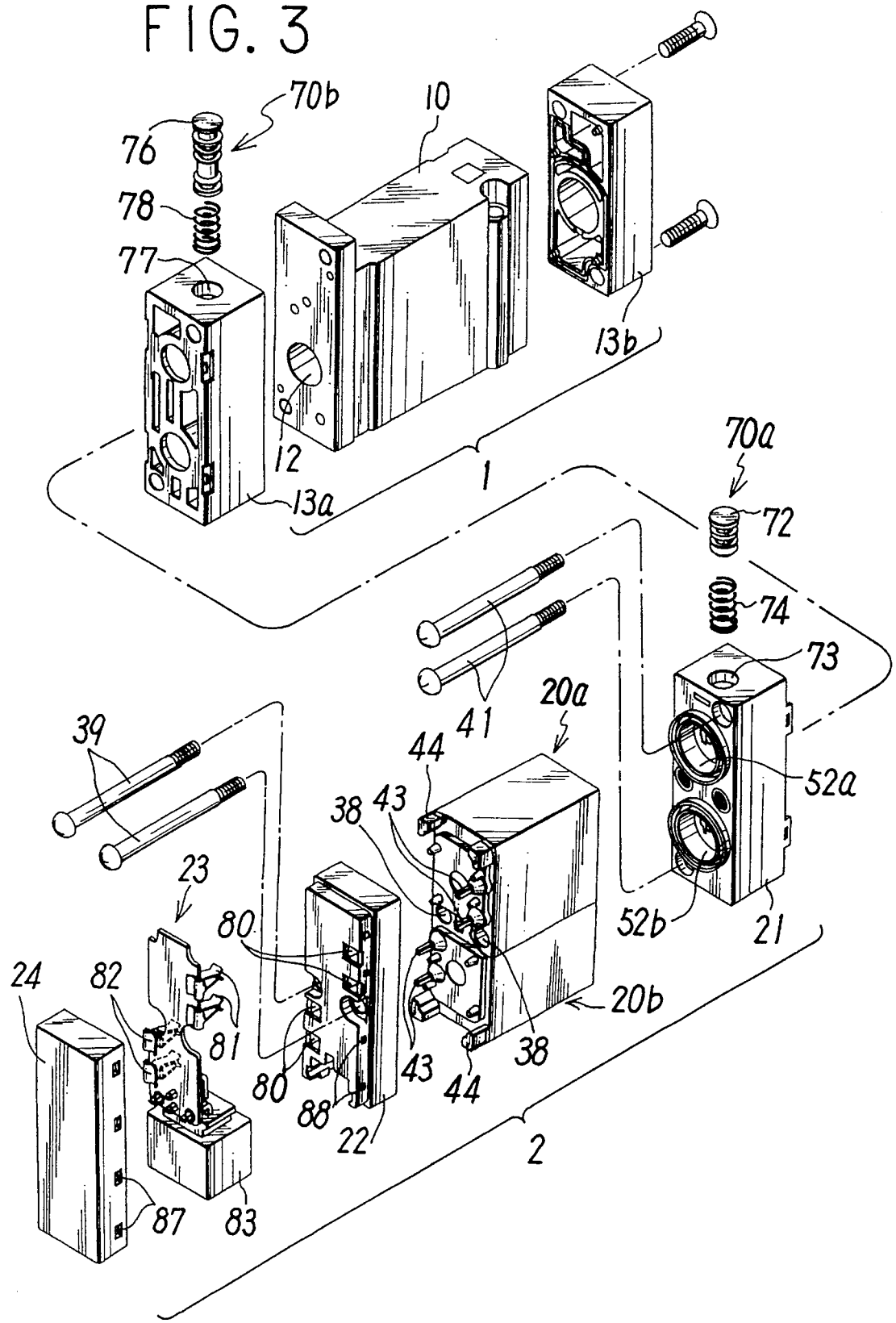
FIG. 3 is an exploded perspective view of the selector valve of FIG. 1.

As it is evident from FIG. 2 and FIG. 3, the terminal block 22 to constitute power feeding means to feed power to the solenoids 20a and 20b is removably fixed on end surfaces of the two connected solenoids 20a and 20b by the above bolts 39, and holes 80 are provided at the corresponding positions to match the receiving terminals 43 of the solenoids 20a and 20b.

The terminal board 23 is provided with electrical components 82 such as indicator lamp, counter electromotive force preventive device, etc. in addition to the power feeding terminals 81 as many as the receiving terminals 43 of the solenoids 20a and 20b. On lower end of the terminal board 23, a terminal box 83 with a plug terminal 84 for connecting to power supply is removably mounted in such manner that forward end 84a of the plug terminal 84 is engaged in a hole of the terminal board 23. The terminal board 23 is mounted on an outer surface of the terminal block 22 by inserting the feeding terminal 81 into a hole 80 of the terminal block 22 and by connecting it to each of the receiving terminals 43 of the solenoids 20a and 20b.

The cover 24 to cover the terminal board 23 has a plurality of engaging holes 87 on its side. By engaging nails 88 on outer side of the terminal block 22 into these engaging holes 87, the cover is removably mounted on the terminal block 22.

Figure 6:
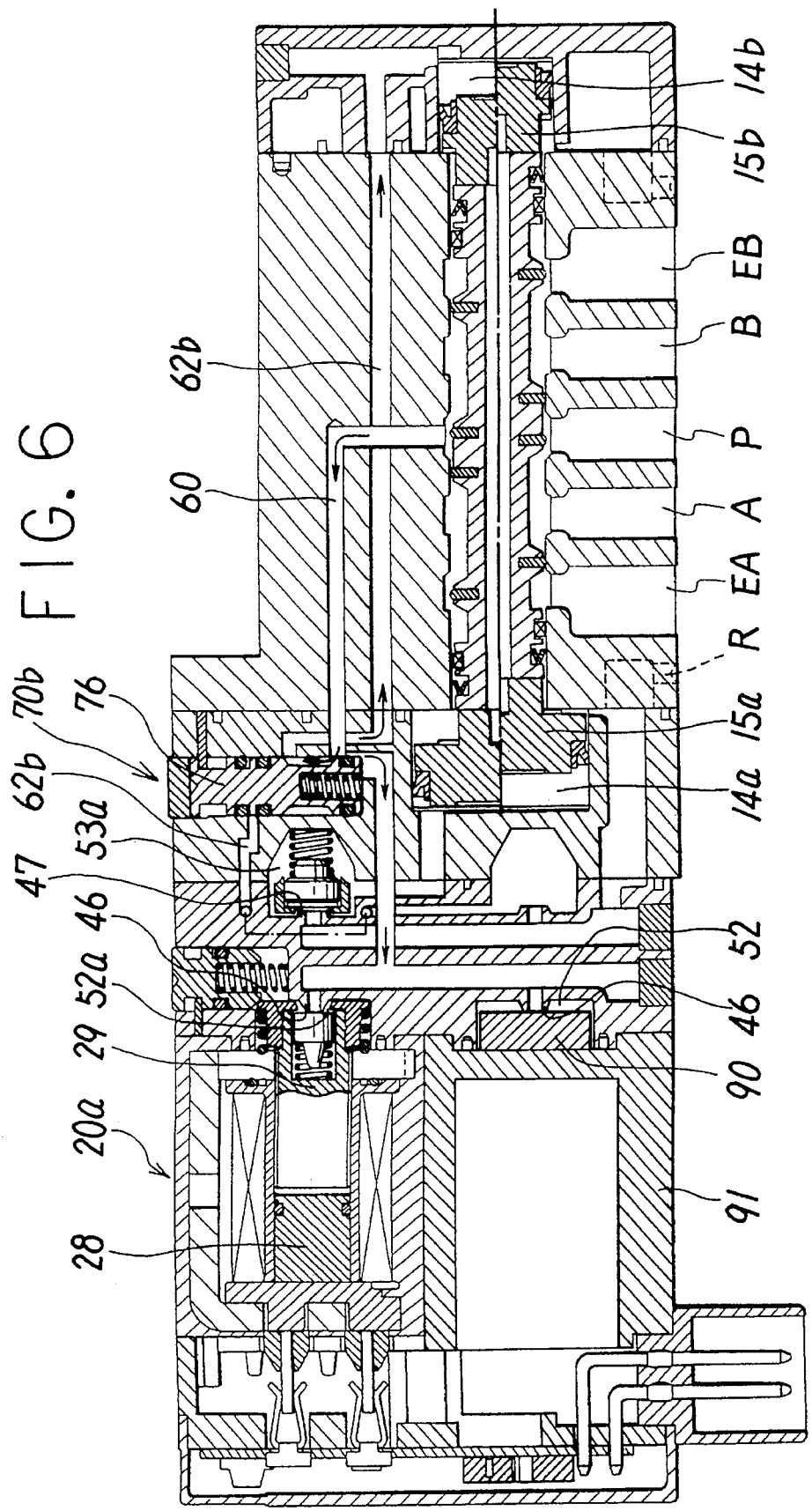
FIG. 6 is a cross-sectional view of a single-solenoid type selector valve, which is a second embodiment of the present invention.
Figure 7:
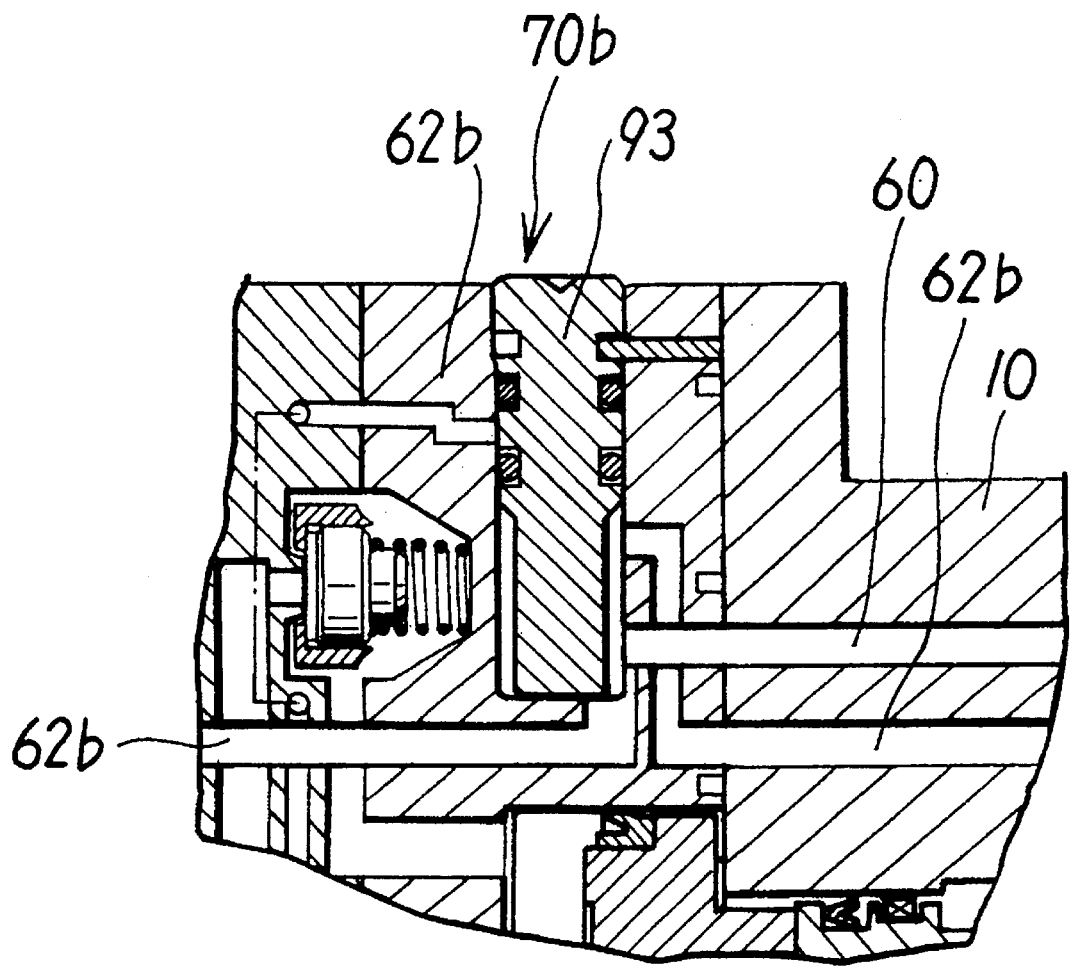
FIG. 7 is a cross-sectional view of an essential part of the second embodiment, showing a variation of the manual operator in the single-solenoid type selector valve.

FIG. 6 represents a single-solenoid type selector valve as a second embodiment of the present invention. This single-solenoid type selector valve is prepared by removing one solenoid mechanism from the double-solenoid type selector valve described above and by simple manipulation and parts replacement associated with the above removal.

Specifically, this single-solenoid type selector valve comprises a single solenoid mechanism 20a, which opens or closes a pilot supply valve seat 46 (opened to a supply valve chest 52a) between an input port P and a large size piston chamber 14a, and a pilot discharge valve seat 47 (opened to a discharge valve chest 53a) between a large size piston chamber 14a and a pilot discharge port R. A manual operator 70b for supplying or discharging pilot fluid to or from a small size piston chamber 14b retains an operating shaft 76 by an adequate means by pushing it down, and a passage 60 connecting the input port P with the pilot supply valve seat 46 (opened to the supply valve chest 52b) and a passage 62b connecting the small size piston chamber 14b with the pilot discharge valve seat 47 not in use (opened to the discharge valve chest 53b) is short-circuited. Thus, the input port P and the small size piston chamber 14b are directly communicated. Further, the pilot supply valve seat 46 not in use is closed by an adequate means such as a sealing member 90.

In the single-solenoid type selector valve with the above arrangement, when power is connected to the solenoid mechanism 20a, the movable iron core 29 is attracted to the fixed iron core 28, and the pilot supply valve seat 46 is opened and the pilot discharge valve seat 47 is closed. As a result, the input port P and the large size piston chamber 14a are communicated with each other, and pilot fluid flows into the large size piston chamber 14a and pushes the large size piston 15a to the right in the figure. In this case, pilot fluid is constantly supplied to the small size piston chamber 14b on the opposite side from the input port P, pushing the small size piston 15b to the left in the figure. Because the force by the large size piston 15a is higher, the main valve disc 11 is moved to the right.

When the power to the solenoid mechanism 20a is turned off, the pilot supply valve seat 46 is closed and the pilot discharge valve seat 47 is opened. The pilot fluid in the large size piston chamber 14a is discharged, and the main valve disc 11 is moved to the left by the force of the small size piston 15b.

In the single-solenoid type selector valve described above, it is preferable that a dummy body 91 to fill the space is mounted at the position corresponding to the pilot supply valve seat 46 not in use and the pilot discharge valve seat 47 and adjacent to the solenoid mechanism 20a, which is provided alone. In this case, a connecting mechanism 32 as shown in FIG. 5 similar to the one used in the first embodiment is provided on the sides of the solenoid mechanism 20b and the dummy body 91 to integrally connect the solenoid mechanism 20b with the dummy body 91.

With regard to the feeding terminals 81 to be mounted on the terminal board 23, only the one corresponding to the receiving terminal 43 of one solenoid mechanism 20b should be held.

In FIG. 6, the manual operator used for the double-solenoid type selector valve is used as the manual operator 70b, pushing the operating shaft 76 downward. Instead of the operating shaft 76, a special-purpose operating shaft 93, which can maintain the input port P and the small size piston chamber 14b directly communicated with each other, may be provided.

As described above, it is possible according to the present invention to obtain the double-solenoid type selector valve or a single-solenoid type selector valve in simple and reliable manner by providing large and small size pistons 15a and 15b having different pressure receiving areas and by performing simple manipulation and parts replacement associated with the change of the solenoid mechanisms.

It is needless to say that the present invention is not limited to the structures of the above embodiments, and modifications and changes can be made without departing from the spirit and the scope of the object of the invention.

What we claim are:

1. An electromagnet pilot type selector valve, comprising:

a main valve body having an input port, an output port and a discharge port for main fluid and a spool type main valve disc for switching communication between these ports;

two end plates mounted on both ends in an axial direction of the main valve body;

large and small pistons for driving the main valve disc having different pressure receiving areas and being mounted at both ends in the axial direction of the main valve disc in large and small size piston chambers formed on said end plates;

a pilot valve body mounted on one of the end plates and provided with two pilot supply valve seats positioned between the input port and the piston chambers, and two pilot discharge valve seats positioned between the piston chambers and the pilot discharge port;

a solenoid mechanism replaceably mounted on the pilot valve body and used for opening or closing said pilot supply valve seats and the pilot discharge vale seats;

two manual operators for manually communicating the input port with the large size and the small size piston chambers;

a power feeding means for feeding power to the solenoid mechanism;

a solenoid mechanism for opening or closing the pilot supply valve seat between the input port and the large size piston chamber and the pilot discharge valve seat between the large size piston chamber and the pilot discharge port, and the manual operator corresponding to the small size piston chamber maintains the input port and the small size piston chamber directly communicated with each other, and the pilot supply valve seat not in use and positioned between the input port and the small size piston chamber is closed by an adequate means to make the valve serve as a single-solenoid type selector valve; and a dummy body for filling a space is mounted at a position to match the pilot supply valve seat not in use and the pilot discharge valve seat and adjacent to the solenoid mechanism, which is provided alone.

2. An electromagnetic pilot type selector valve according to claim 1, wherein the solenoid mechanism and the dummy body are integrally connected with each other by connecting mechanisms formed on sides thereof.

3. An electromagnetic pilot type selector valve according to claim 2, further comprising:

a connecting means associated with the solenoid mechanism and the dummy and including engaging rims and engaging grooves in parallel to axial lines of the solenoid mechanism and the dummy body; and wherein, said connecting means connects the solenoid mechanism to the dummy body by engaging said engaging rims with said engaging grooves, the solenoid mechanism and the dummy body are closely connected and over-lapped with each other without causing a gap between them.

4. An electromagnetic pilot type selector valve according to claim 1, wherein the pressure receiving areas for the large and small pistons have different volumes.

* * * * *